United States Patent
Sahai et al.

(10) Patent No.: US 11,872,429 B2
(45) Date of Patent: Jan. 16, 2024

(54) COMMISSIONING A FIRE SYSTEM

(71) Applicant: Honeywell International Inc., Charlotte, NC (US)

(72) Inventors: Deepika Sahai, New Delhi (IN); Amit Jain, Bangalore (IN); Karthik Kumar Davanam, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 82 days.

(21) Appl. No.: 17/147,095

(22) Filed: Jan. 12, 2021

(65) Prior Publication Data

US 2022/0219032 A1 Jul. 14, 2022

(51) Int. Cl.
G08B 29/04 (2006.01)
A62C 37/50 (2006.01)
G05B 15/02 (2006.01)
G08B 25/14 (2006.01)

(52) U.S. Cl.
CPC .............. *A62C 37/50* (2013.01); *G05B 15/02* (2013.01); *G08B 25/14* (2013.01); *G08B 29/043* (2013.01)

(58) Field of Classification Search
USPC ........................................................ 700/275
See application file for complete search history.

(56) References Cited

U.S. PATENT DOCUMENTS

| | | | | |
|---|---|---|---|---|
| 9,575,477 B2* | 2/2017 | Blount | .................... | G08B 25/10 |
| 10,375,047 B2* | 8/2019 | Leblond | ................... | H04L 67/12 |
| 2012/0154141 A1 | 6/2012 | Piccolo, III | | |
| 2014/0218164 A1* | 8/2014 | Mahapatra | .............. | H04L 67/34 |
| | | | | 340/5.1 |
| 2014/0247346 A1* | 9/2014 | Bozarth | ................ | A63F 13/235 |
| | | | | 348/143 |
| 2016/0086045 A1* | 3/2016 | Roberts | ................ | G06V 10/245 |
| | | | | 382/183 |
| 2017/0099647 A1* | 4/2017 | Shah | ................... | H04W 12/069 |
| 2017/0230930 A1 | 8/2017 | Frey | | |
| 2018/0011461 A1* | 1/2018 | Camarasa | ............ | G08B 19/005 |
| 2018/0075731 A1* | 3/2018 | Frenette | ........... | G06Q 10/06395 |
| 2019/0206146 A1* | 7/2019 | Higgins | ................... | G07C 3/08 |
| 2020/0304494 A1 | 9/2020 | Meruva et al. | | |
| 2022/0036026 A1* | 2/2022 | Roux | ................... | G06K 7/1417 |

FOREIGN PATENT DOCUMENTS

EP 3001260 3/2016

OTHER PUBLICATIONS

Extended European Search Report for related European Application No. 22150285.9, dated Jun. 27, 2022 (8 pgs).

* cited by examiner

*Primary Examiner* — Emilio J Saavedra
(74) *Attorney, Agent, or Firm* — Brooks, Cameron & Huebsch, PLLC

(57) ABSTRACT

Commissioning a fire system is described herein. One embodiment includes a non-transitory machine-readable medium having instructions stored thereon which, when executed by a processor, cause the processor to receive an indicator of a particular fire control panel of a fire system installed in a building, and provide an interface via a display for configuring a gateway device associated with the fire control panel responsive to receiving the indicator, the interface including a plurality of portions, wherein each portion is configured to receive a respective descriptor corresponding to the fire control panel.

18 Claims, 3 Drawing Sheets

COMMISSIONING A FIRE SYSTEM

TECHNICAL FIELD

The present disclosure relates generally to a commissioning a fire system.

BACKGROUND

Large facilities (e.g., buildings), such as commercial facilities, office buildings, hospitals, and the like, may have fire control systems that can be used to prevent a fire from occurring in a facility, and/or to detect and/or manage a fire occurring in the facility. A fire control system may include a number of components located throughout the facility (e.g., on different floors of the facility). For example, a fire control system may include sensors (e.g., smoke detectors) that can sense a fire occurring in the facility, alarms that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other components. A fire control system may also include a physical fire control panel (e.g., box) installed in the facility that can be used by a user to directly control the operation of the components of the fire control system.

A gateway device may be used by a user (e.g., maintenance technician or operator) to perform inspections, maintenance, and/or upgrades, among other operations, on a fire control system (e.g., on the components of the fire control system) of a facility. Commissioning a fire control system can include connecting a fire control panel to a network (e.g., cloud network) via a gateway.

Previous approaches to commissioning a fire control system may include multiple users performing multiple operations at different times using different tools. The disconnect between different users and their operations can lead to delays. In an example commissioning process, an engineered systems distributor (ESD) may acquire a gateway device and wait for a technician to physically set it up. At some point after setup, the ESD may associate the panel with the customer and/or the site using a desktop tool. Previous approaches may suffer from a lack of tracking when one task is completed and the next should proceed, especially when multiple users alternate tasks.

DETAILED DESCRIPTION

Figure 1:
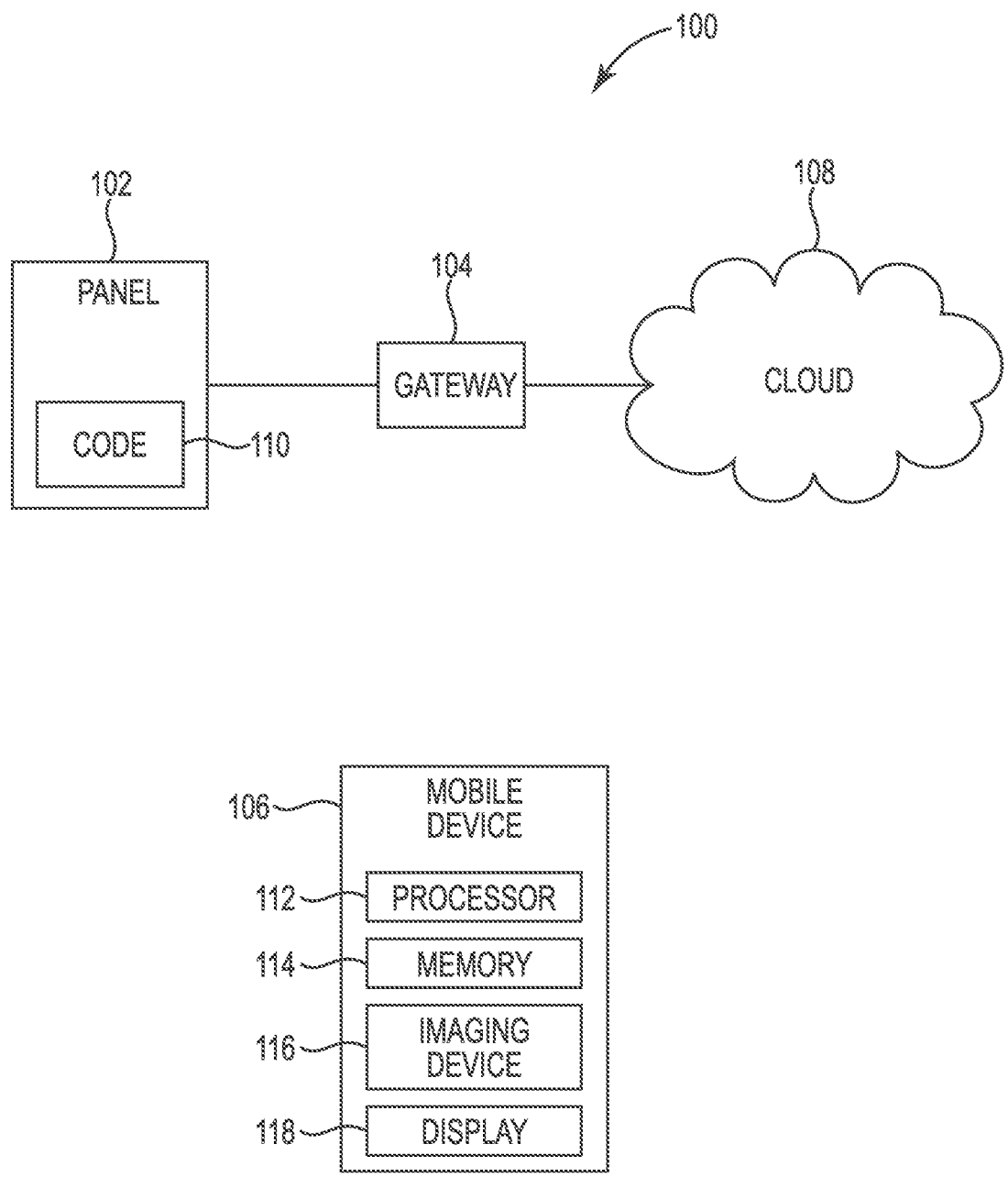
FIG. 1 illustrates an example of a system for commissioning a fire system in accordance with one or more embodiments of the present disclosure.

Commissioning a fire system is described herein. For example, embodiments include a non-transitory machine-readable medium having instructions stored thereon which, when executed by a processor, cause the processor to receive an indicator of a particular fire control panel of a fire system installed in a building, and provide an interface via a display for configuring a gateway device associated with the fire control panel responsive to receiving the indicator, the interface including a plurality of portions, wherein each portion is configured to receive a respective descriptor corresponding to the fire control panel.

Previous approaches to commissioning a fire control system may include multiple users performing multiple operations at different times using different tools. The disconnect between different users and their operations can lead to delays. In contrast, embodiments herein can provide a seamless end-to-end workflow that allows a user (e.g., an installer, technician, etc.) to physically connect a gateway to a panel and link the panel with descriptors, such as a customer, a site, and/or a building, among other descriptors. As a result, the user can complete the commissioning in a logical order and the steps involved can be taken in one setting. The simplicity of use and intuitiveness of embodiments herein can increase the efficiency and productivity of the user. Additionally, once commissioned, a panel can be easily accessed to determine test statuses of devices of the fire system (e.g., sensors, actuators, alarms, etc.).

In some embodiments, for example, a barcode or Quick Response (QR) code can be placed (e.g., attached, affixed, etc.) to a panel. The code can identify the panel or a gateway connected to it (e.g., via a unique identifier). The panel can be in communication with a remote network (e.g., a cloud). In some embodiments, the panel can communicate directly with the remote network. In some embodiments, the panel can communicate with the remote network via the gateway. A gateway in accordance with the present disclosure is capable of communicating with external cloud services via a wired and/or wireless connection. Using a mobile device, the code can be scanned and its identifier can be associated with a customer, a site, a building, and/or with the panel itself. Thereafter, scanning the code can allow the display of information regarding the fire system, the site, test statuses of device(s) and other information.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designator "N" as used herein, particularly with respect to reference numerals in the drawings, indicates that a number of the particular feature so designated can be included with a number of embodiments of the present disclosure. This number may be the same or different between designations.

FIG. 1 illustrates an example of a system 100 for commissioning a fire system in accordance with one or more embodiments of the present disclosure. The fire system 100 can be the fire control system of a facility (e.g., building), such as, for instance, a large facility having a large number of floors, such as a commercial facility, office building, hospital, and the like. However, embodiments of the present disclosure are not limited to a particular type of facility. The building can be a portion of a site that includes a plurality of buildings.

As shown in FIG. 1, the system 100 includes a panel 102, a gateway device (sometimes referred to herein simply as "gateway") 104, a mobile device 106, and a cloud 108. The panel 102 can be any different type of physical control panel, such as a control box, installed in the building.

As shown, and as previously discussed, the panel 102 can have a code 110 thereon. In some embodiments, the code 110 can be a bar code. In some embodiments the code 110 can be a QR code. In some embodiments, the code 110 may be affixed to a surface of the panel 102. For example, the code 110 can be a sticker adhered to the panel 102.

The mobile device 106 can be a mobile computing device. The mobile device 106 can be a phone, tablet, laptop, etc. The mobile device 106 can include a processor 112 and a memory 114. Memory 114 can be any type of storage medium that can be accessed by processor 112 to perform various examples of the present disclosure. For example, memory 114 can be a non-transitory machine-readable medium having computer readable instructions (e.g., computer program instructions) stored thereon that are executable by processor 112 to perform various examples of the present disclosure. That is, processor 112 can execute the executable instructions stored in memory 114 to perform various examples in accordance with the present disclosure.

Memory 114 can be volatile or nonvolatile memory. Memory 652 can also be removable (e.g., portable) memory, or non-removable (e.g., internal) memory. For example, memory 114 can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 114 is illustrated as being located in mobile device 106, embodiments of the present disclosure are not so limited. For example, memory 114 can also be located internal to another computing resource (e.g., enabling computer readable instructions to be downloaded over the Internet or another wired or wireless connection).

The mobile device 106 can include a user interface 118. A user can interact with the mobile device 106 via the user interface 118. For example, the user interface 118 can provide (e.g., display) information to and/or receive information from (e.g., input by) the user of the computing device.

In some embodiments, user interface 118 can be a graphical user interface (GUI) that can include a display (e.g., a screen) that can provide information to, and/or receive information from, the user of the mobile device 106. The display can be, for instance, a touch-screen (e.g., the GUI can include touch-screen capabilities). As an additional example, the user interface 118 can include a keyboard and/or mouse that the user can use to input information into the mobile device 106, and/or a speaker that can play audio to, and/or receive audio (e.g., voice input) from, the user. Embodiments of the present disclosure, however, are not limited to a particular type(s) of user interface.

The mobile device 106 can include an imaging device 116. In some embodiments the imaging device 116 can be a camera. The imaging device 116 can capture an image (e.g., an image of the code 110, previously discussed).

Though not illustrated in FIG. 1, the system 100 can include a plurality of devices located throughout a building (e.g., on different floors of the building) that can be used to detect and/or manage a fire occurring in the building, and/or to prevent a fire from occurring in the building. For example, such devices may include sensors (e.g., smoke detectors) that can sense a fire occurring in the facility, alarms that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other components.

The panel 102 can be used by a user to monitor and/or control devices of the system 100. For instance, a user can use the panel 102 to directly control the operation of (e.g., actions performed by) devices of the fire system. Further, the panel 102 can receive (e.g., collect) data, such as, for instance, real-time operational data, associated with the devices of the fire system. Such data can include, for instance, current operational statuses, operational states, and/or properties of the devices.

The cloud 108 can refer to a network and/or a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, cloud 108 can include a number of servers that receive information from, and transmit information to, gateway 108, panel 102, and/or mobile device 106 via a wired or wireless network.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

As used herein, the term "cloud", or distributed control network, can be used to refer to a server and/or computing device working in conjunction with other computing resources (hardware, software, logic, memory, processor, etc.) that can be used as a service over a communications network (in a wired and/or wireless manner over the internet). The server, computing device, and other computing resources can all be referred to as being part of the "cloud."

A user can visit the building and can connect the gateway 104 to the panel 102 allowing communication between the gateway 104 and the panel 102. In some embodiments, the user may be instructed to connect the gateway to the panel (e.g., via the mobile device). The connection may be provided using a suitable wired connection, for instance. The user can capture an image of (e.g., "scan") the code 110 using the imaging device 116 of the mobile device.

Figure 2:
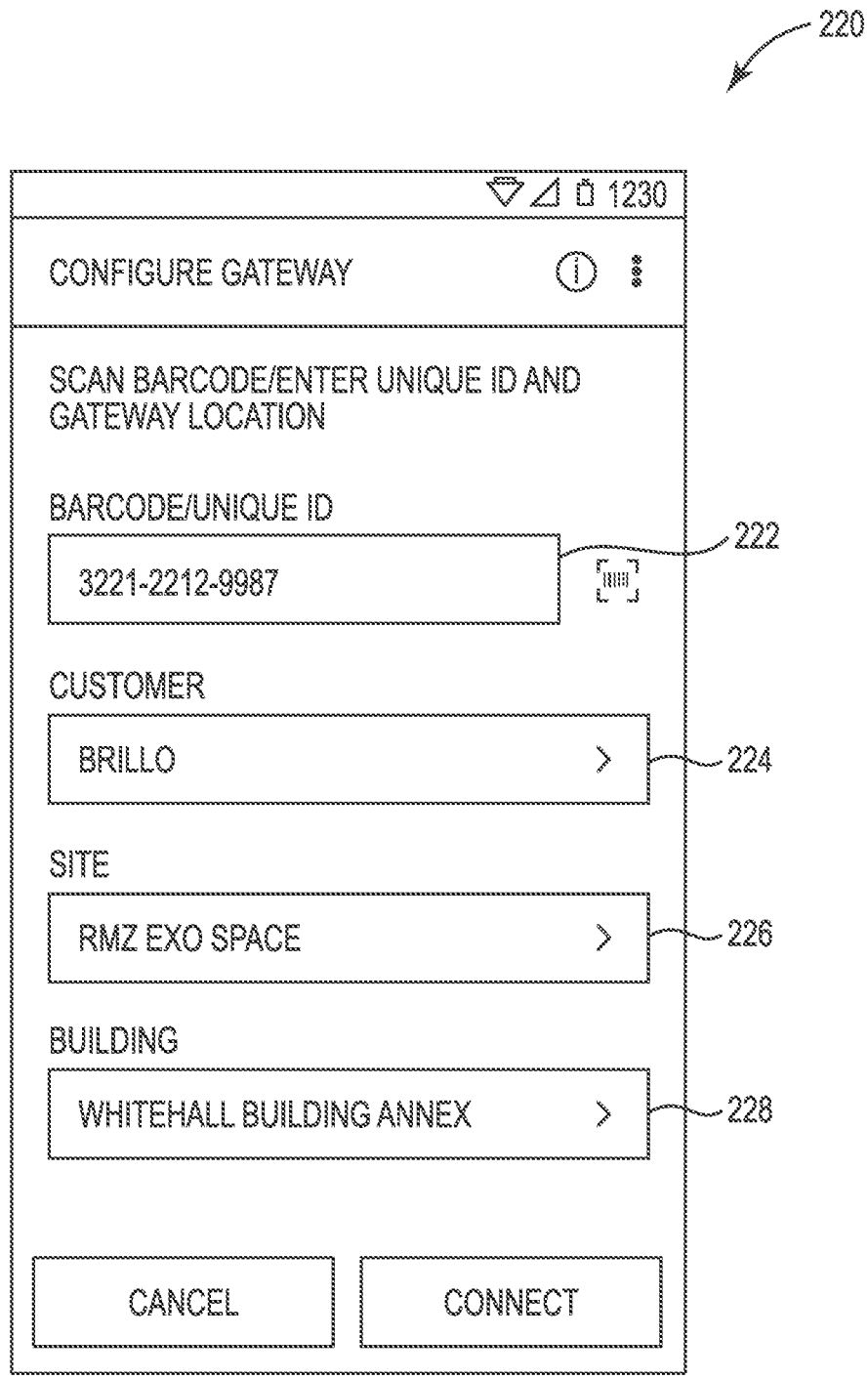
FIG. 2 illustrates an interface associated with commissioning a fire system in accordance with one or more embodiments of the present disclosure.

FIG. 2 illustrates an interface 220 associated with commissioning a fire system in accordance with one or more embodiments of the present disclosure. After scanning the code 110, an indicator 222 corresponding to the panel 102 can be determined and/or displayed via the interface 220. In some embodiments, the indicator 222 can be input via the interface 222 (e.g., by a user). The indicator 222 can be a numeric indicator, though embodiments of the present disclosure are not so limited. The indicator 222 may be unique to the panel 102.

The interface 220 can include additional portions, each configured to receive a respective descriptor corresponding to the panel 102. For instance, a first portion 224 can be configured to receive a customer identification associated with the panel 102. The customer identification can be an enterprise (e.g., business) name, for instance.

A second portion 226 can be configured to receive a site identification associated with the panel 102. The site identification can be a name associated with the fire control system and may include a plurality of buildings, for instance. A third portion 228 can be configured to receive a building identification associated with the panel 102. The building identification can include a name of the building in which the panel 102 is installed. In some embodiments, one or more of the first portion 224, the second portion 226, and the third portion 228 can include a selectable menu and/or list. For example, one or more of the customer identification, the site identification, and/or the building identification can be selected from a drop-down menu. In some embodiments, a user can input (e.g., type) the customer identification, the site identification, and/or the building identification using an interface, such as the interface 118, previously discussed in connection with FIG. 1.

Upon receiving the descriptors and/or the selection of a display element (e.g., "connect") the gateway can be configured and/or commissioned (e.g., associated with the panel and its devices). In some embodiments, a panel list can be displayed that includes a plurality of panels associated with the configured gateway device. Selection of one of the panels may cause display of information corresponding to the selected panel and/or fire system devices associated with the selected panel. The panel list can include a respective numerical identifier for each panel and a respective location of each panel, in some embodiments.

Figure 3:
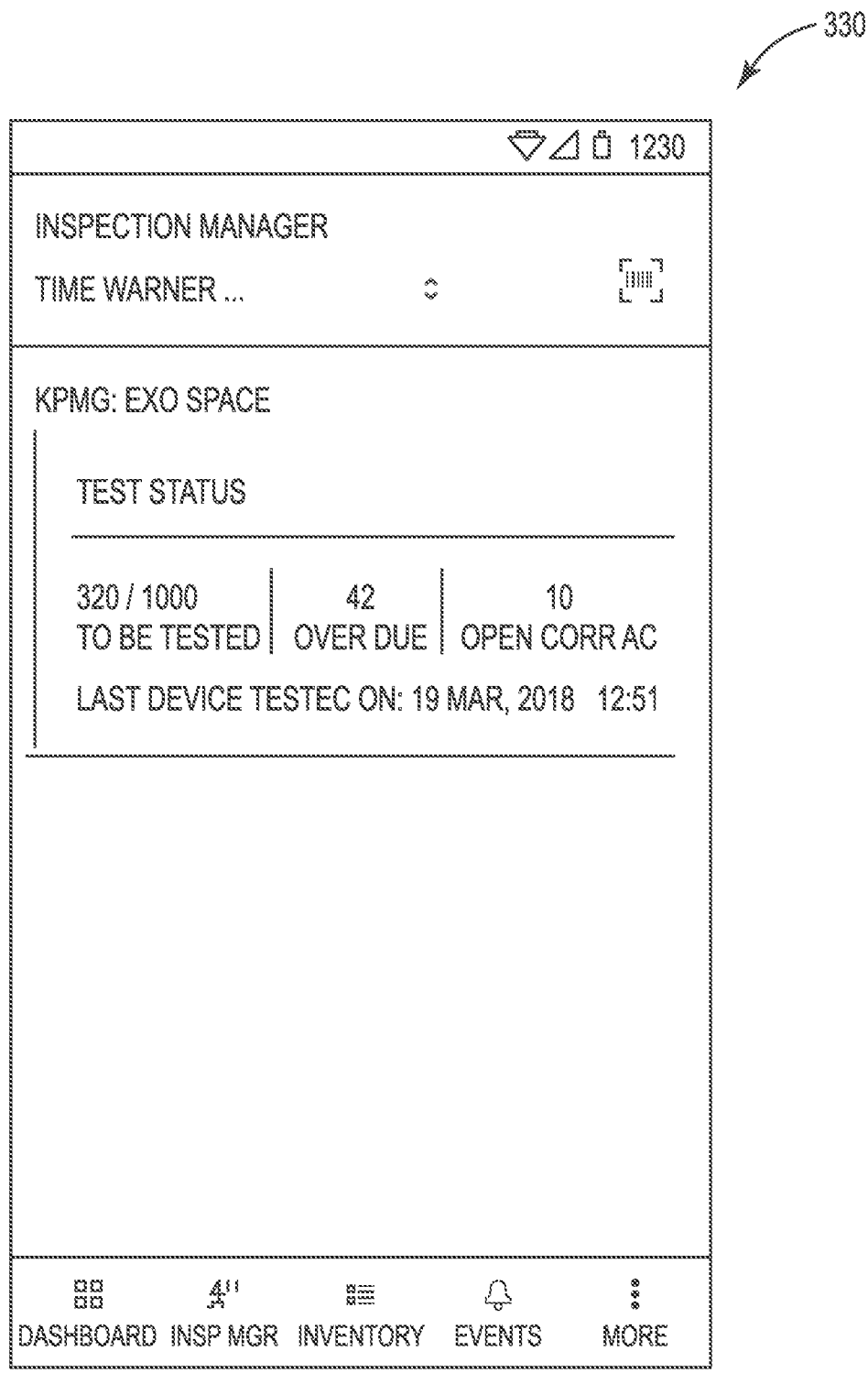
FIG. 3 illustrates another interface associated with commissioning a fire system in accordance with one or more embodiments of the present disclosure.

FIG. 3 illustrates another interface 330 associated with commissioning a fire system in accordance with one or more embodiments of the present disclosure. The interface 330 may be herein referred to as a "test status" 330. In accordance with embodiments of the present disclosure, once the gateway device is configured, subsequent scanning of the code 110 may cause the test status 330 to be displayed (e.g., via the mobile device 106, previously discussed in connection with FIG. 1).

In some embodiments, a subsequent scan of the code 110 can cause the test status 330 to be displayed. In some embodiments, additional user input via the mobile device may cause the test status 330 to be displayed. In some embodiments, a respective test status for each of a plurality of fire system devices associated with the panel can be displayed. In some embodiments, a proportion (e.g., percentage) of the plurality of devices associated with the panel for which a particular test has been performed can be displayed. In some embodiments, a time associated with a most recent test performed on a device of the fire system can be displayed. In some embodiments, a quantity of open corrective actions corresponding to a plurality of devices of the fire system can be displayed. In some embodiments, a most recent date of inspection of the site and/or the building can be displayed. In some embodiments, a quantity of devices of the fire system for which testing is overdue can be displayed.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium having instructions stored thereon which, when executed by a processor, cause the processor to:
   receive an image of a machine-readable code corresponding to a particular fire control panel of the fire system installed in the building;
   provide an interface via a display for configuring a gateway device associated with the fire control panel responsive to receiving the indicator, the interface including a plurality of portions, wherein each portion is configured to receive a respective descriptor corresponding to the fire control panel;
   receive the respective descriptors via the interface;
   configure the gateway device based on the respective descriptors;
   receive a subsequent image of the machine-readable code; and
   display a respective test status associated with each respective one of a plurality of fire system devices controlled by the fire control panel via the display responsive to receiving the subsequent image.

2. The medium of claim 1, wherein the instructions to receive the indicator include instructions to receive an input made using an interface.

3. The medium of claim 1, wherein the instructions to provide the interface include instructions to provide:
   a first portion of the interface configured to receive a customer identification associated with the fire control panel;
   a second portion of the interface configured to receive a site identification associated with the fire control panel; and
   a third portion of the interface configured to receive a building identification associated with the fire control panel.

4. The medium of claim 1, including instructions to configure the gateway device based on the respective descriptors while the gateway device is physically connected to the fire control panel.

5. The medium of claim 1, wherein each portion is configured to receive a respective descriptor selected from a list of descriptors.

6. A device for commissioning a fire control system, comprising:
   a processor; and
   a memory having instructions stored thereon which, when executed by the processor, cause the processor to:
      receive an image of a machine-readable code corresponding to a particular fire control panel of a fire system installed in a building;
      determine an identity of the particular fire control panel based on the image;
      provide an interface via a display for configuring a gateway device associated with the fire control panel responsive to determining the identity of the fire control panel, the interface including a plurality of portions, wherein each portion is configured to receive a respective descriptor corresponding to the fire control panel, the plurality of portions including:
         a first portion configured to receive a customer identification descriptor associated with the fire control panel;
         a second portion configured to receive a site identification descriptor associated with the fire control panel; and
         a third portion configured to receive a building identification descriptor associated with the fire control panel;
   receive the respective descriptors via the interface;
   configure the gateway device based on the respective descriptors;
   receive a subsequent image of the machine-readable code; and
   display a respective test status associated with each respective one of a plurality of fire system devices controlled by the fire control panel via the display responsive to receiving the subsequent image.

7. The device of claim 6, wherein the instructions to receive the image of the machine-readable code corresponding to the particular fire control panel of the fire system installed in the building include instructions to receive an image of a Quick Response (QR) code corresponding to the particular fire control panel of the fire system installed in the building, and wherein the QR code is on a surface of the particular fire control panel.

8. The device of claim 7, including instructions to determine the identity of the particular fire control panel based on the image of the QR code.

9. A method of commissioning a fire control system, comprising:
   receive an image of a machine-readable code corresponding to a particular fire control panel of a fire system installed in a building at a site;
   determine an identity of the particular fire control panel based on the image;
   provide an interface via a display for configuring a gateway device associated with the fire control panel responsive to receiving the indicator, the interface including a plurality of portions, wherein each portion is configured to receive a respective descriptor corresponding to the fire control panel;
   receiving the respective descriptors via the interface;
   configuring the gateway device based on the respective descriptors;
   receiving a subsequent image of the machine-readable code; and
   displaying a respective test status associated with each respective one of a plurality of fire system devices controlled by the fire control panel via the display responsive to receiving the subsequent image.

10. The method of claim 9, wherein the method includes displaying a panel list including a plurality of fire control panels associated with the gateway device responsive to configuring the gateway device based on the respective descriptors.

11. The method of claim 10, wherein the method includes displaying, for each of the plurality of fire control panels associated with the gateway device:
   a respective numerical identifier; and
   a respective location.

12. The method of claim 9, wherein the method includes displaying the test status associated with the fire control panel via the display responsive to receiving the identity of the particular fire control panel via an interface of a mobile device.

13. The method of claim 9, wherein displaying the respective test statuses includes displaying a proportion of the plurality of devices for which a particular test has been performed.

14. The method of claim 9, wherein displaying the respective test statuses includes displaying a time associated with a most recent test performed on a device of the fire system.

15. The method of claim 9, wherein displaying the respective test statuses includes displaying a quantity of open corrective actions corresponding to the plurality of fire system devices.

16. The method of claim 9, wherein displaying the respective test statuses includes displaying a most recent date of inspection of the site.

17. The method of claim 9, wherein displaying the respective test statuses includes displaying a quantity of the plurality of devices of the fire system for which testing is overdue.

18. The method of claim 9, wherein the method includes instructing a user to physically connect the gateway device to the fire control panel during commissioning.

* * * * *